(12) United States Patent
Chandwani et al.

(10) Patent No.: US 10,171,591 B2
(45) Date of Patent: *Jan. 1, 2019

(54) CONNECTING PUBLIC CLOUD WITH PRIVATE NETWORK RESOURCES

(71) Applicant: MICROSOFT TECHNOLOGY LICENSING, LLC, Redmond, WA (US)

(72) Inventors: Santosh Chandwani, Redmond, WA (US); Jayteerth Narasingrao Katti, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/904,015

(22) Filed: Feb. 23, 2018

(65) Prior Publication Data

US 2018/0183879 A1    Jun. 28, 2018

Related U.S. Application Data

(63) Continuation of application No. 14/708,859, filed on May 11, 2015, now Pat. No. 9,912,755.

(Continued)

(51) Int. Cl.
*G06F 15/16* (2006.01)
*H04L 29/08* (2006.01)
*H04L 29/06* (2006.01)

(52) U.S. Cl.
CPC ........ *H04L 67/141* (2013.01); *H04L 63/0281* (2013.01); *H04L 63/10* (2013.01);
(Continued)

(58) Field of Classification Search
CPC ..... H04L 67/10; H04L 63/10; H04L 63/0815; H04L 63/0838; H04L 9/3228
(Continued)

(56) References Cited

U.S. PATENT DOCUMENTS 4,761,019 A    8/1988  Dubensky
9,201,704 B2 *  12/2015 Chang ................. G06F 9/45558
(Continued)

FOREIGN PATENT DOCUMENTS

EP    2228968 A2    9/2010
EP    2381363 A2    10/2011
GB    2323757 A     9/1998

OTHER PUBLICATIONS

"AWS Direct Connect", Retrieved from °°https://aws.amazon.com/directconnect/?nc1=h_12_cn<<, Mar. 2, 2014, 4 Pages.
(Continued)

*Primary Examiner* — Phuoc H Nguyen
(74) *Attorney, Agent, or Firm* — Workman Nydegger (57) ABSTRACT

The automatic provisioning of a connection between a public cloud and an on-premises resource in a private network. This allows a connection to be more easily made when an application in the public cloud is to access that on-premises resource in the private network. The automatic provisioning is initiated upon determining that an application running in the public cloud is to access the on-premises resource. The provisioning occurs by identifying a bridging infrastructure that provides access to the on-premises resource. Credentials are then accessed for later use in connecting to the bridging infrastructure. Application-specific credentials are securely provided to the application. The application-specific credentials are usable by an agent on the public cloud to connect to the identified bridging infrastructure. A configuration packages is then created that includes resource-specific credentials, the identity of the on-premises resource and an executable.

20 Claims, 7 Drawing Sheets

Related U.S. Application Data (60) Provisional application No. 61/992,073, filed on May 12, 2014.

(52) U.S. Cl.
CPC .............. *H04L 67/02* (2013.01); *H04L 67/10* (2013.01); *H04L 67/28* (2013.01); *H04L 67/2809* (2013.01); *H04L 63/08* (2013.01)

(58) Field of Classification Search
USPC ........................................................ 709/217
See application file for complete search history.

(56) References Cited

U.S. PATENT DOCUMENTS

| | | | |
|---|---|---|---|
| 9,344,487 B2* | 5/2016 | Barzilay | H04L 67/10 |
| 9,424,062 B1* | 8/2016 | Mummidi | G06F 9/45558 |
| 2005/0273849 A1 | 12/2005 | Araujo et al. | |
| 2012/0096171 A1* | 4/2012 | Suit | H04L 12/6418 |
| | | | 709/227 |
| 2012/0179820 A1 | 7/2012 | Ringdahl et al. | |
| 2012/0281706 A1 | 11/2012 | Agarwal et al. | |
| 2012/0281708 A1 | 11/2012 | Chauhan et al. | |
| 2012/0311108 A1 | 12/2012 | Brandwine et al. | |
| 2012/0331528 A1 | 12/2012 | Fu et al. | |
| 2013/0067550 A1 | 3/2013 | Chen et al. | |
| 2013/0142201 A1 | 6/2013 | Kim et al. | |
| 2014/0108665 A1* | 4/2014 | Arora | H04L 67/141 |
| | | | 709/227 |
| 2014/0280961 A1* | 9/2014 | Martinez | H04L 41/5054 |
| | | | 709/226 |
| 2014/0366155 A1* | 12/2014 | Chang | G06F 21/10 |
| | | | 726/27 |
| 2015/0326579 A1 | 11/2015 | Chandwani et al. | |

OTHER PUBLICATIONS

"Hybrid Connections (Preview)", Retrieved from °°https://blogs.msdn.microsoft.com/biztalk_server_team_blog/2014/05/12/hybrid-connections-preview/<<, May 12, 2014, 4 Pages.

"Microsoft IT Evolves its Network for Public Cloud Connectivity", Retrieved from °°https://web.archive.org/web/20140620081554/http://technet.microsoft.com/en-us/library/dn690280.aspx<<, Apr. 2014, 10 Pages.

"Non Final Office Action Issued in U.S. Appl. No. 14/708,859", dated May 8, 2017, 11 Pages.

"Notice of Allowance Issued in U.S. Appl. No. 14/708,859", dated Oct. 24, 2017, 7 Pages.

"International Search Report & Written Opinion Issued in PCT Patent Application No. PCT/US2015/030223", dated Sep. 16, 2015, 12 Pages.

"Second Written Opinion Issued in PCT Application No. PCT/US2015/030223", dated Apr. 15, 2016, 8 Pages.

Annapureddy, Koushik, "Security Challenges in Hybrid Cloud Infrastructures", In Proceedings of T-110.5290 Seminar on Network Security, Nov. 2010, 6 Pages.

"International Search Report & Written Opinion Issued in PCT Application No. PCT/US2015/030222", dated Sep. 22, 2015, 11 Pages.

"Second Written Opinion Issued in PCT Application No. PCT/US2015/030222", dated Apr. 15, 2016, 7 Pages.

"International Preliminary Report on Patentability Issued in PCT Application No. PCT/US2015/030223", dated Jul. 29, 2016, 9 Pages.

"Non Final Office Action Issued in U.S. Appl. No. 14/708,867", dated May 19, 2017, 26 Pages.

"Notice of Allowance Issued in European Patent Application No. 15726433.4", dated Feb. 2, 2018, 5 Pages.

\* cited by examiner

CONNECTING PUBLIC CLOUD WITH PRIVATE NETWORK RESOURCES

CROSS-REFERENCE TO RELATED APPLICATIONS

This application is a continuation of U.S. patent application Ser. No. 14/708,859 filed on May 11, 2015, entitled "CONNECTING PUBLIC CLOUD WITH PRIVATE NETWORK RESOURCES," which issued as U.S. Pat. No. 9,912,755 on Mar. 6, 2018, which claims the benefit of and priority to U.S. Provisional Patent Application Ser. No. 61/992,073 filed on May 12, 2014, and entitled "CONNECTING PUBLIC CLOUD APPLICATIONS WITH PRIVATE NETWORK RESOURCES," both of which applications are incorporated herein by reference in their entirety.

BACKGROUND

Public cloud hosting platforms host applications that use resources, such as databases and services. Conventionally, the resources used by such applications hosted on the public cloud are also located within the public cloud. If the resources are located within a private network, then those resources would be moved to the public cloud in order to be used by such applications. However, for security, compliance or legal reasons, some resources cannot be moved to the public cloud.

In order to allow access to these resources on private networks, network administrators are often required to open ports in their firewalls to allow traffic from the internet into their network, deploy proxies and/or gateways in the network DeMilitarized Zone (DMZ) that forward external traffic to the resource, or use a Virtual Private Network (VPN) to connect the application to their private network.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to the automatic provisioning of a connection between a public cloud and an on-premises resource in a private network. This allows a connection to be more easily made when an application in the public cloud is to access that on-premises resource in the private network. The automatic provisioning is initiated upon determining that an application running in the public cloud is to access the on-premises resource. Examples of on-premises resources include databases, data stores, web services, application servers, and so forth.

The provisioning occurs by identifying a bridging infrastructure that provides access to the on-premises resource. The bridging infrastructure is part of the public cloud infrastructure and may be provisioned or allocated by a service designed for this purpose. Select elements of this bridging infrastructure may be allocated or created on demand if required. Credentials used to access the bridging infrastructure are then accessed for later use in connecting to the bridging infrastructure. Application-specific credentials with send rights are securely and automatically provided to the application runtime for the application that is to access the resource on the private network. The application-specific credentials are usable by an agent embedded in the runtime of the application on the public cloud to connect to the identified bridging infrastructure. A configuration package is then created that includes resource-specific credentials, the identity of the on-premises resource and an executable. The executable may be interacted with by a user to deploy a proxy on the private network that provides secure connectivity between the on-premises resource and the bridging infrastructure using the resource-specific credentials. The proxy is located inside the private network and uses outbound communication from the private network to connect to the bridging infrastructure. Thus, the network administrators do not have to open firewall ports or establish VPN connections for the proxy to connect to the bridging infrastructure.

At least some embodiments described herein relate to the automatic establishing of the connection between an application in the public cloud and the on-premises resource. First, the bridging infrastructure is automatically accessed. The bridging infrastructure is configured to interact with a first control within the private network. For instance, this first control may be represented as a proxy hosted on the private network and that is deployed by an executable within the configuration package used in provisioning the connection. The proxy securely connects to the bridging infrastructure and forwards traffic between the bridging infrastructure and the on-premises resource. A second control is provided to the application running in the public cloud. The second control is structured such that the at least one application may be used to securely connect via the bridging infrastructure with an on-premises resource of the private network.

In one example, the second control may be realized as an agent embedded in the application runtime, which control intercepts messages from the application destined for the on-premises resource, frames it over an appropriate network message or tunneling protocol and re-directs them over the bridging infrastructure to the first control, which in turn forwards it to the on-premises resource. The response follows the reverse path back to the application on the public cloud.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

At least some embodiments described herein relate to the automatic provisioning of a connection between a public cloud and an on-premises resource in a private network. This allows a connection to be more easily made when an application in the public cloud is to access that on-premises resource in the private network. The automatic provisioning is initiated upon determining that an application running in the public cloud is to access the on-premises resource. Examples of on-premises resources include databases, data stores, web services, application servers and so forth.

The provisioning occurs by identifying a bridging infrastructure that provides access to the on-premises resource. The bridging infrastructure is part of the public cloud infrastructure and may be provisioned or allocated by a service designed for this purpose. The network identity of the on-premises resource is configured as metadata for the bridging infrastructure. Select elements of this bridging infrastructure may be allocated or created on demand if required. Credentials used to access the bridging infrastructure are then accessed for later use in connecting to the bridging infrastructure. Application-specific credentials with send rights are securely and automatically provided to the application runtime for the application that is to access the resource on the private network. The application-specific credentials are usable by an agent embedded in the application runtime on the public cloud to connect to the identified bridging infrastructure. A configuration package is then created that includes resource-specific credentials, the identity of the on-premises resource and an executable. For instance, the executable may be identified by a Uniform Resource Identifier (URI) that contains the identity of the bridging infrastructure and a one-time password with the receive rights that can be used to access the bridging infrastructure. The executable may be interacted with by a user to deploy a proxy on the private network that provide connectivity between the on-premises resource and the bridging infrastructure using the resource-specific credentials.

At least some embodiments described herein relate to the automatic establishing of the connection between an application in the public cloud and the on-premises resource. First, the bridging infrastructure is automatically accessed. The bridging infrastructure is configured to interact with a first control within the private network. For instance, this first control may be represented as an executable within the configuration package used in provisioning the connection. The proxy securely connects to the bridging infrastructure and forwards traffic between the bridging infrastructure and the on-premises resource. A second control is provided to the application running in the public cloud. The second control is structured such that the at least one application may be used to securely connect via the bridging infrastructure with an on-premises resource of the private network.

In one example, the second control may be realized as an agent embedded in the application runtime, which control intercepts messages from the application destined for the on-premises resource, frames it over an appropriate network message or tunneling protocol and re-directs them over the bridging infrastructure to the first control, which in turn forwards it to the on-premises resource. The response follows the reverse path back to the application on the public cloud.

Some introductory discussion of a computing system will be described with respect to FIG. 1. Then, the principles of provisioning and utilizing a bridging infrastructure in order to allow a public cloud to use resources in a private network will be described with respect to subsequent Figures.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

Figure 1:
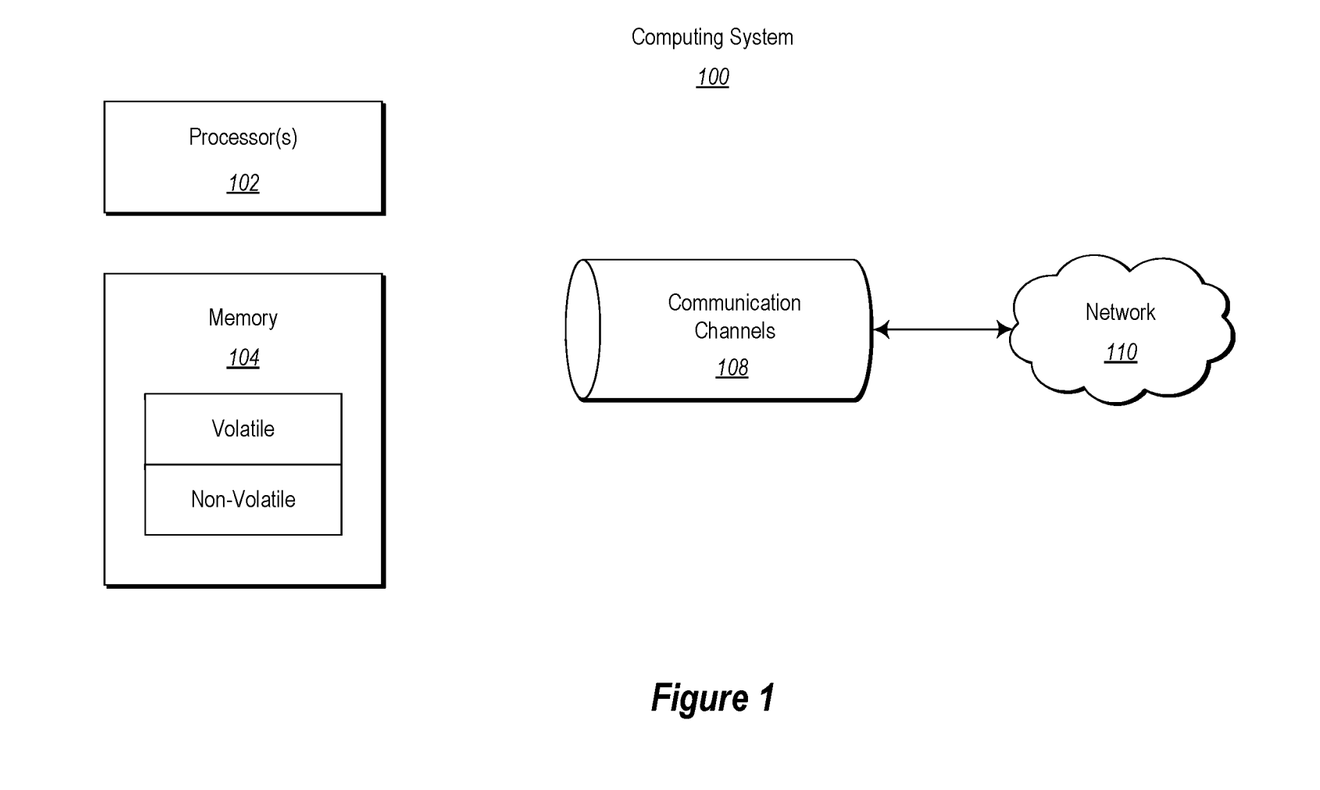
FIG. 1 abstractly illustrates a computing system in which some embodiments described herein may be employed.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "executable module" or "executable component" can refer to software objects, routines, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors (of the associated computing system that performs the act) direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other computing systems over, for example, network 110. The computing system 100 also includes a display, which may be used to display visual representations to a user.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. The computer executable instructions may be, for example, binaries or even instructions that undergo some translation (such as compilation) before direct execution by the processors, such as intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

In accordance with the principles described herein, applications that are hosted on public clouds communicate with resources on remote private networks just as if the application was running locally on that private network. Furthermore, such connectivity may be configured with just a few gestures. By having an agent embedded in the runtime on which the application is hosted, such connectivity may be established with literally a few configuration gestures involving 1) creating a logical representation of the remote resource with the associated bridging infrastructure, 2) installation of a proxy for that remote resource on the private network that automatically connects to the bridging infrastructure and 3) automatically configuring the agent in the application runtime to intercept the traffic for the remote resource and directing it to the bridging infrastructure. One unique capability of this mechanism is that entire application groupings (or tiers) such as the web or mobile tiers can be moved from private networks to public clouds without any code or configuration change while keeping other critical tiers such as databases on the secure private networks.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Figure 2:
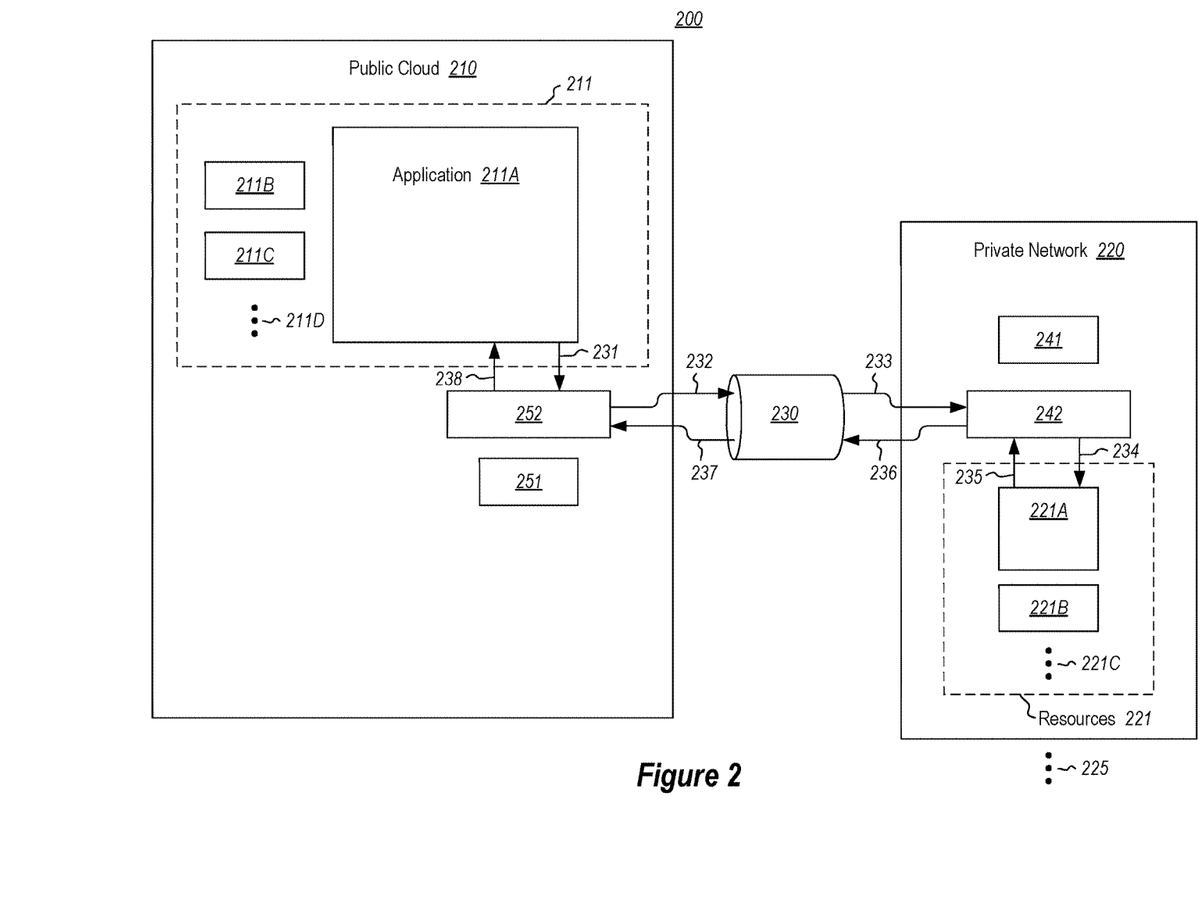
FIG. 2 illustrates an environment in which the principles described herein may operate, and which includes a public cloud and a private network interconnected with a bridging infrastructure.

FIG. 2 illustrates an environment 200 in which the principles described herein may operate. The environment 200 includes a public cloud 210 and a private network 220. The public cloud 210 has operating therein a variety of applications 211. For instance, the public cloud 210 is illustrated as operating therein applications 211A, 211B and 211C, although the ellipses 211D represents flexibility in the number of applications operated by a public cloud 210. The application 211A is illustrated slightly larger as it will be used as a primary example describe herein. The public cloud 210 may implement a cloud computing model that has multiple customers—hence the term "public".

The private network 220 has operating therein on-premises resources 221. For instance, the on-premises resources 221 are illustrated as including resources 221A and 221B, although the ellipses 221C represents that there may be a large variety of resources operating within the private network 220. The resource 221A is illustrated slightly larger as it will be used as a primary example describe herein. Examples of resources that may be accessed include, for instance, databases, servers, storage, files, directories, and so forth. There is also a bridging infrastructure 230 to be used by the application 211A in the public cloud 210 in order to access the resource 221A in the private network 220. The arrows 231 through 238 represent an example data flow associated with the use of the bridging infrastructure 230 and will be described further below in conjunction with FIG. 7.

Figure 3:
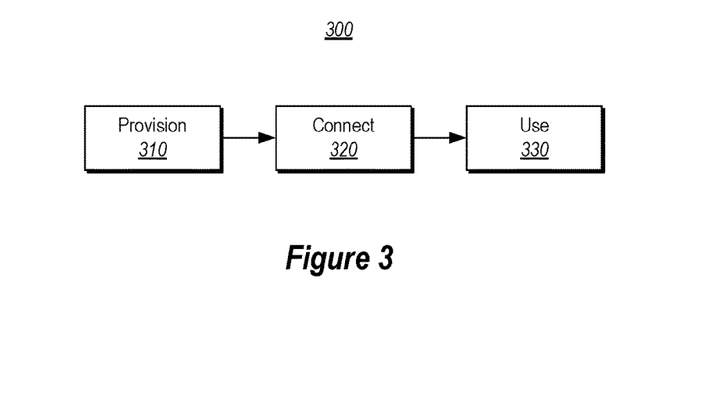
FIG. 3 illustrates three temporal stages associated with the bridging infrastructure.

As illustrated in FIG. 3, there are three temporal stages 300 associated with the bridging infrastructure. The provisioning stage 310 is followed by the connecting stage 320, which is followed by the use stage 330. The purpose of the provisioning stage 310 is to make the connection stage 320 easier and more automatic to perform. In fact, the connection stage 320 may be deferred until just prior to the use stage 330, at which time the public cloud actually uses the bridging infrastructure 230 in order to communicate with the on-premises resource 221A.

Figure 4:
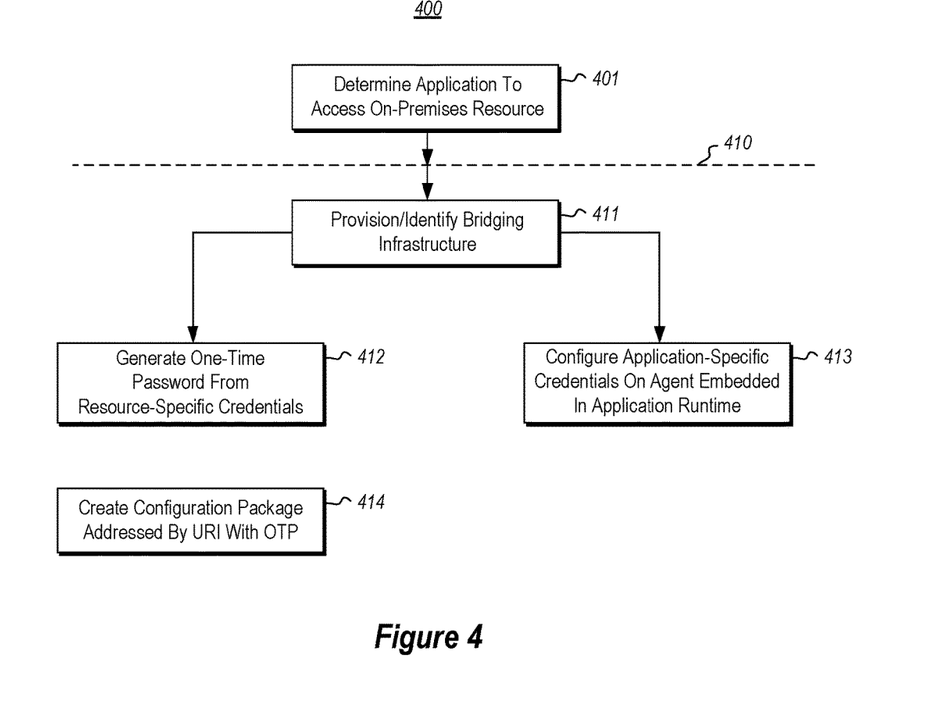
FIG. 4 illustrates a flowchart of a method for provisioning a connection between a public cloud and an on-premises resource in a private network.

FIG. 4 illustrates a flowchart of a method 400 for automatically provisioning a connection between a public cloud and an on-premises resource in a private network. The method 400 is one example of the provisioning stage 310 of FIG. 3. As the method 400 may be performed in the network environment 200 of FIG. 2, the method 400 of FIG. 4 will now be described with frequent reference to FIG. 2.

The method 400 is initiated upon determining that an application running in the public cloud is to access an on on-premises resource of the private network (act 401). For instance, a user within the private network 220 may determine that the application 211A of the public cloud 210 is to access resource 221A of the private network 210. For instance, application 211A may require access to the resource 221A located within the private network 220 to serve information or to process requests. Such intent to access the remote resource may be indicated or configured by the developer of application 211A during application development. Alternatively, this intent may be determined during deployment or configuration of the application 211A by the administrator.

The method 400 is performed by automatically performing the content below line 410 upon the user interacting with the control (e.g., the hyperlink). Specifically, a bridging structure is identified that provides access to the on-premises resource (act 411). This might be included as arguments within the hyperlink. Accordingly, the web site might assign the bridging infrastructure upon the user providing the identity of the on-premises resource to the web site. The credentials used to connect to the bridging infrastructure are then accessed (act 412). This includes the application-specific credential 251 being provided to the application 211A in the public cloud 210 (act 413). For instance, in FIG. 2, the resource-specific credential 241 may be used to establish a first control 242 that connects the bridging infrastructure 230 with the on-premises resource 221A. The application-specific credential 242 may be used to establish a second control 252 that connects the bridging infrastructure 230 with the application 211A.

Furthermore, the method 400 includes creating (act 414) a configuration package that includes resource-specific credentials, an executable for a control 242 and the identity of the on-premises resource. The executable for the control 242 is configured to be executed upon selection of the control by a user and provides connectivity between the on-premises resource on private network and the bridging infrastructure using the resource-specific credentials. In other words, the executable may be used to establish the first control 242.

Accordingly, upon completion of the method 400, the private network 220 of the environment 200 has resource-specific credentials 241, and a control 242 that may be interacted with (in the context of having the resource-specific credentials 241) in order to establish a connection between the resource 221A and the bridging infrastructure 230. Furthermore, the public cloud 210 has application-specific credentials 251, and a control 252 that may be used by the public cloud (in the context of having the application-specific credentials 251) in order to establish a connection between the application 211A and the bridging infrastructure 230.

The method may be performed multiple times for different resources in the private network 220 order to establish a different bridging infrastructure for each on-premises resource. There might be a different resource-specific control for each resource. In some embodiments, if multiple applications are to use the same on-premises resource, the corresponding control 242 may be used to connect to the on-premises resource for multiple applications running in the public cloud. There also might be a different application-specific control for each application connecting to the on-premises resource. In some embodiments, if multiple applications are to use the same on-premises resource, they may share the same control 252. Ellipses 225 represent that similar bridging infrastructures may be established between the public cloud 210 and other private networks as well.

Figure 5:
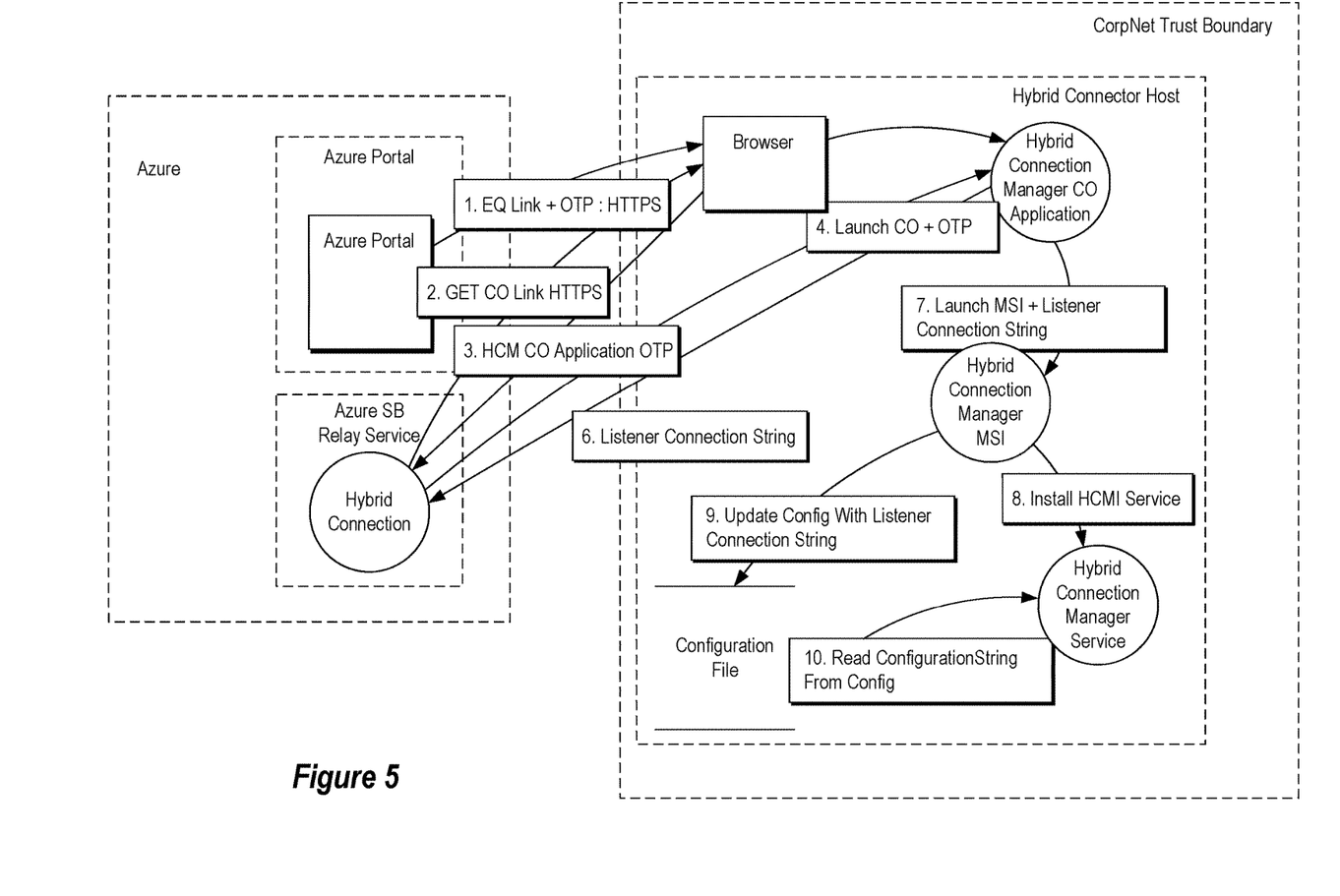
FIG. 5 illustrates a specific example of data flows associated with provisioning a connection between a public cloud and an on-premises resource in a private network.

FIG. 5 illustrates an example environment in which the bridging infrastructure is provisioned with the resource proxy control 242 set up to be hosted in the private network. In this diagram, a public cloud is labelled as "Azure". However, the principles described herein may be applied to any public cloud to enable connectivity with resources in a private network, regardless of the provider or identity of the public cloud. The trust boundary of the private network is labelled as "Corpnet Trust Boundary". The connection between the public cloud and the private network to allow the application in the public cloud to access the resource in the private network will be referred to herein as a "hybrid connection".

First, the user creates a logical hybrid connection specifying the network address of the remote resource on the private network. This automatically generates two credentials; a first credential (i.e., the resource-specific credential) with receive rights on the on-premises proxy, and a second credential (i.e., the application-specific credential) with send rights for the application on the public cloud. This also automatically generates a short-lived one-time password (OTP), and embeds the password as a query parameter in a link to the resource proxy for the private network (see arrow 1 in FIG. 5).

The user then may click the link to the on-premises proxy from the private network (see arrow 2 in FIG. 5). This causes the application to be downloaded (see arrow 3 in FIG. 5).

The application extracts the short-lived one-time password (OTP) from the link's query parameter and uses the password to acquire the credential with the Receive right. The application then configures the proxy service ("hybrid connection manager CO Application" in FIG. 5) on the private network and provides it the credential with the receive right.

The proxy service on the private network then automatically starts. The proxy service uses the credential with the receive right to determine which on-premises resource it is designed to proxy, and then configures itself as a proxy for that service. Arrows 4 through 10 in FIG. 5 show how this might occur for a particular implementation, but other The application on the public cloud is configured with a link to the desired logical hybrid connection representing the remote resource on the private network. The credential with the send right is configured on the application, and the application connects to the logical hybrid connection.

Figure 6:
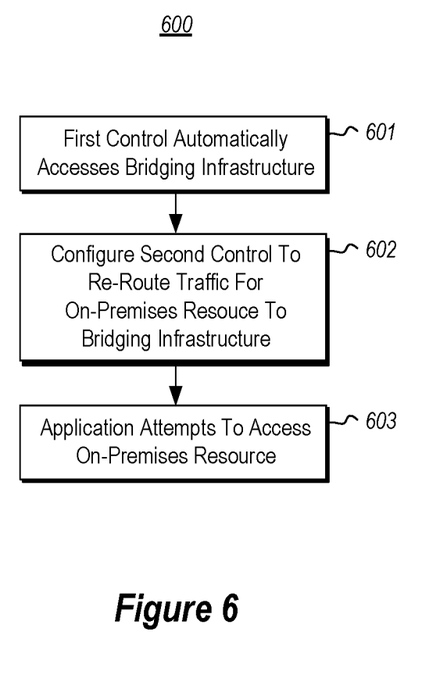
FIG. 6 illustrates a flowchart of a method for establishing access from a public cloud to an on-premises resource in a private network.

FIG. 6 illustrates a flowchart of a method 600 for establishing access from a public cloud to an on-premises resource in a private network. The method 600 may be performed as part of the connecting stage 320 of FIG. 3, and may be performed in the context of the environment 200 of FIG. 2. Accordingly, the method 600 of FIG. 6 will now be described with frequent reference to the environment 200 of FIG. 2.

The method includes automatically accessing (act 601) a bridging infrastructure that is to operate between the public cloud and the private network. For instance, referring to FIG. 2, the bridging infrastructure 230 is configured to interact with a user system within the private network 220 using a first control 242. The first control 242 is structured such that, when configured with the resource-specific credentials for the bridging infrastructure, the first control 242 automatically establishes a secure connection to the bridging infrastructure 230. When such a connection established, the first control 242 identifies the on-premises resource 221A that the bridging infrastructure 230 was provisioned to access. Further, the first control 242 is structured to receive intercepted traffic from the bridging infrastructure 230, where that intercepted traffic was forwarded onto the bridging infrastructure 230 by the second control 252. The first control 242 configures itself to forward intercepted traffic from bridging infrastructure 230 to resource 221A. The second control 252 likewise is configured to intercept traffic from the application 211A and destined for the on-premises resource 221A, framing it in an appropriate framing message and rerouting it onto the bridging infrastructure 230. Furthermore, the second control 252 is provided (act 602) to the application running in the public cloud 210. The second control 252 is structured such that the application 221A may securely connect via the bridging infrastructure 230 with an on-premises resource of the private network. The second control 252 may always maintain the connection with the bridging infrastructure 230 or alternatively the connection may be established on demand. If the connection is established on demand, then as application 211A attempts to access resource 221A (act 603), the second control 252 finalizes the communicative path between the application 211A and the on-premises resource 221A.

Figure 7:
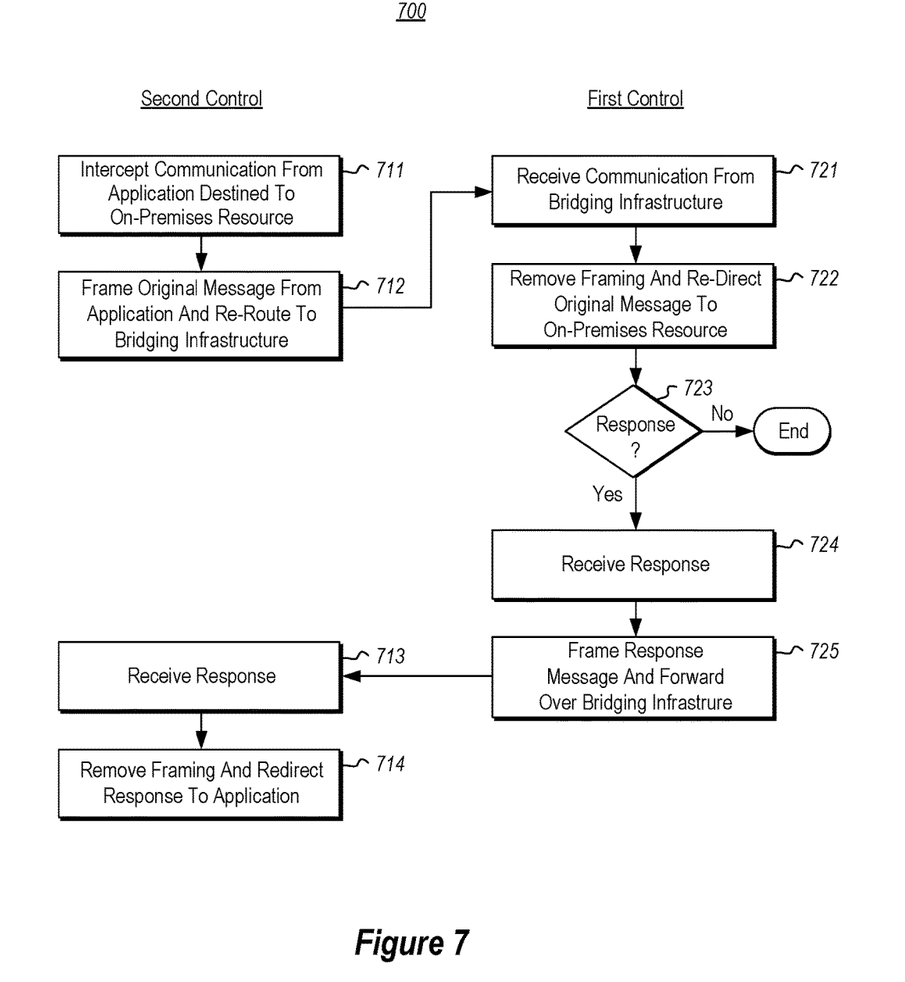
FIG. 7 illustrates a flowchart of a method for using the bridging infrastructure once connected to the application and the on-premises resource in the private cloud.

FIG. 7 illustrates a flowchart of a method 700 for using the bridging infrastructure once connected to the application and the on-premises resource in the private cloud. The method 700 represents an example of the usage stage 630 of FIG. 6. The method 700 may be performed within the environment 200 of FIG. 2 to cause a number of data flows 231 through 238 referenced in FIG. 2. Accordingly, the method 700 of FIG. 7 will now be described with respect to the environment 200 of FIG. 2. Acts performed by the second control are referenced in the left column of FIG. 7 under the heading ("Second Control") and are labelled in the 710s. Acts performed by the first control are referenced in the right column of FIG. 7 under the heading ("First Control") and are labelled in the 720s.

The second control first intercepts (act 711) a communication from the application that is destined for the on-premises resource. For instance, in FIG. 2, the second control 252 receives (as represented by arrow 231) the communication from the application 211A. This communication may be the structured the same as would be if the resource were to be accessed from within the public cloud. Accordingly, the application 211A itself may be completely agnostic about where the resource is actually located. The existence of the communication channel established by the first control 242, the second control 252 and the bridging infrastructure 230 may be something that is abstracted away from the view of the application 211A.

The second control then frames the original message from the application 211A using an appropriate framing or tunneling mechanism and redirects (act 712) the communication over the bridging infrastructure for routing by the first control to the on-premises resource. Framing the original message preserves any message headers or other control information that may be required for access-control or to correctly process the original message by the on-premises resource. Of course this communication may be encrypted for security. For instance, in FIG. 2, the second control 252 is illustrated as redirecting (represented by arrow 232) the communication over the bridging infrastructure 230.

The first control then receives the redirected communication over the bridging infrastructure (act 721). For instance, in FIG. 2, the first control 242 is illustrated as receiving the communication (represented by arrow 233). The first control then removes the framing from the original message and redirects the communication to the on-premises resource (act 722). For instance, in FIG. 2, the first control 242 is illustrated as redirecting the communication (represented by arrow 234) to the on-premises resource 221A. If there is no response to the communication from the on-premises resource ("No" in decision block 723), then the method 700 may then end.

If there is a response to the communication ("Yes" in decision block 723), then the first control receives that response (act 724), frames it using the chosen framing mechanism and forwards that response over the bridging infrastructure (act 725). For instance, in FIG. 2, the first control 242 receives a response (as represented by arrow 235) from the on-premises resource 221A and redirects the response (as represented by arrow 236) onto the bridging infrastructure 230.

The second control receives the response (act 713) over the bridging infrastructure, removes the framing added by the first control and redirects the original response from the on-premises resource to the application 211A (act 714). For instance, in FIG. 2, the second control 242 receives the response (as represented by arrow 237) over the bridging infrastructure 230 and redirects the response (as represented by arrow 238) back to the application. In some embodiments, the response may appear the same or have the same schema regardless of whether the on-premises resource was within the public cloud or the private network.

Figure 8:
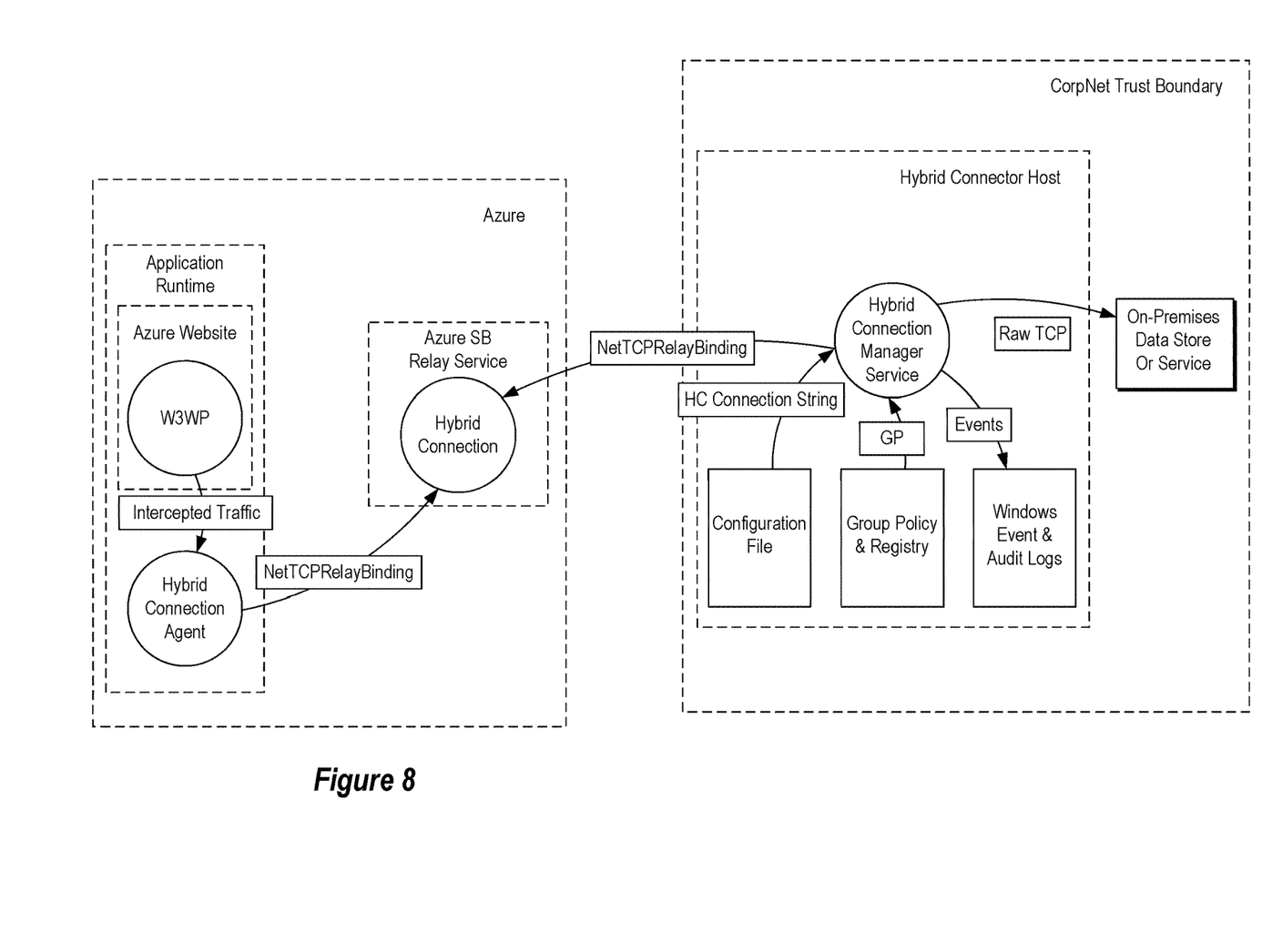
FIG. 8 illustrates a runtime process showing a more specific example of how the application in the public cloud may then access the resource on the private network using the bridging infrastructure.

FIG. 8 illustrates a runtime process showing a more specific example of how the application in the public cloud may then access the resource on the private network using the bridging infrastructure. In this case, the application is a website. Again, although the application is labelled as an "Azure" website, the principles described herein are not limited to any particular public cloud identity or provider, and is not limited to the application provider or identity that is requesting the private network resource. In any case, the application addresses a remote resource (which cannot be directly reached from the public cloud) just as if it were located proximally and if it were directly accessible:

The public cloud platform on which the application is hosted embeds an agent into the application runtime. The agent (the hybrid connection agent in FIG. 8) determines the logical hybrid connection to which the application is linked and the address/port information of the remote resource it represents. The agent intercepts all traffic from the application destined for that remote resource, uses the NetTcpRelayBinding for framing the original message and sends it to the hybrid connection. While the NetTcpRelayBinding is used in this specific example, other framing mechanisms or tunneling protocols may be used.

The hybrid connection forwards all requests sent by the application to the resource proxy ("hybrid connection manager service" in FIG. 8) hosted on the private network for further forwarding to the remote resource. Furthermore, the hybrid connection forwards to the application all responses sent by the remote resource.

The proxy service on the private network uses outbound network connectivity (e.g., over TCP, HTTP, HTTPS or WebSockets) to listen for connection requests from the public cloud. Connection requests from applications on the public cloud are then forwarded to the resource on the private network and responses are returned to the applications on the public cloud. The proxy removes the framing of the NetTcpRelayBinding from the original message before forwarding it to the resource, and conversely adds the framing when returning the response from the resource to the application.

Accordingly, the principles described herein provide a convenient and highly automated mechanism for provisioning, connecting and using a bridging infrastructure that allows an application in a public cloud to connect to an on-premises resource. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for provisioning a connection between a public cloud and an on-premises resource in a private network, the method comprising:
    determining that an application running in the public cloud is to access an on-premises resource of the private network;
    based at least on the determining that the application running in the public cloud is to access an on-premises resource of the private network, automatically generating a one-time password (OTP);
    generating a hyperlink pointing to a network address of the on-premises resource that includes at least the OTP as a query parameter;
    based at least on the hyperlink being selected from within the private network, automatically performing the following:
        identifying a bridging infrastructure that provides access to the on-premises resource;
        causing a configuration package to be downloaded within the private network, wherein the downloaded configuration package uses the OTP from the query parameter of the hyperlink to acquire resource-specific credentials;
        causing a hybrid connection manager on the private network to use the resource-specific credentials to provide connectivity between the on-premises resource on the private network and the bridging infrastructure.

2. The method in accordance with claim 1, the on-premises resource in the private network being a first on-premises resource in the private network, the bridging infrastructure being a first bridging infrastructure, the resource-specific credentials being first resource-specific credentials, the method further comprising:
    determining that the application running in the public cloud is to access a second on-premises resource of the private network;
    automatically performing the following in response to the act of determining that the application running in the public cloud is to access the second on-premises resource of the private network:
    identifying a second bridging infrastructure that provides access to the second on-premises resource;
    accessing second resource-specific credentials used to connect to the second bridging infrastructure;
    creating a configuration package that includes the second resource-specific credentials and the identity of the second on-premises resource, the execution of the executable for the control providing connectivity between the second on-premises resource on private network and the second bridging infrastructure using the second resource-specific credentials.

3. The method in accordance with claim 1, the on-premises resource being a server.

4. The method in accordance with claim 1, the on-premises resource being a database.

5. The method in accordance with claim 1, the on-premises resource being storage.

6. The method in accordance with claim 1, wherein the determining that an application running in the public cloud is to access an on-premises resource of the private network includes navigating to a web site and indicating to that web site that the on-premises resource is to be made available to the public cloud.

7. The method in accordance with claim 1, wherein the method further includes generating application specific credentials that are provided to the application on the public cloud and that are usable by an agent on the public cloud to connect to the identified bridging infrastructure.

8. A computer program product comprising one or more computer-readable hardware storage device having thereon computer-executable instructions that are structured such that, when executed by one or more processors of the computing system, cause the computing system to perform a method for provisioning a connection between a public cloud and an on-premises resource in a private network in response to determining that an application running in the public cloud is to access an on-premises resource of the private network, wherein the method includes:
    based at least on the determining that the application running in the public cloud is to access an on-premises resource of the private network, automatically generating a one-time password (OTP);

generating a hyperlink pointing to a network address of the on-premises resource that includes at least the OTP as a query parameter;
based at least on the hyperlink being selected from within the private network, automatically performing the following:
identifying a bridging infrastructure that provides access to the on-premises resource;
causing a configuration package to be downloaded within the private network, wherein the downloaded configuration package uses the OTP from the query parameter of the hyperlink to acquire resource-specific credentials;
causing a hybrid connection manager on the private network to use the resource-specific credentials to provide connectivity between the on-premises resource on the private network and the bridging infrastructure.

9. The computer program product in accordance with claim 8, the on-premises resource in the private network being a first on-premises resource in the private network, the bridging infrastructure being a first bridging infrastructure, the resource-specific credentials being first resource-specific credentials, the method further comprising:
determining that the application running in the public cloud is to access a second on-premises resource of the private network;
automatically performing the following in response to the act of determining that the application running in the public cloud is to access the second on-premises resource of the private network:
identifying a second bridging infrastructure that provides access to the second on-premises resource;
accessing second resource-specific credentials used to connect to the second bridging infrastructure;
creating a configuration package that includes the second resource-specific credentials and the identity of the second on-premises resource, the execution of the executable for the control providing connectivity between the second on-premises resource on private network and the second bridging infrastructure using the second resource-specific credentials.

10. The computer program product in accordance with claim 8, the on-premises resource being a server.

11. The computer program product in accordance with claim 8, the on-premises resource being a database.

12. The computer program product in accordance with claim 8, the on-premises resource being a web service.

13. The computer program product in accordance with claim 8, wherein the determining that an application running in the public cloud is to access an on-premises resource of the private network includes navigating to a web site and indicating to that web site that the on-premises resource is to be made available to the public cloud.

14. The computer program product in accordance with claim 8, wherein the method further includes generating application specific credentials that are provided to the application on the public cloud and that are usable by an agent on the public cloud to connect to the identified bridging infrastructure.

15. A computer system comprising:
one or more processors;
one or more computer-readable storage media having thereon computer-executable instructions that are structured such that, when executed by the one or more processors, cause the computing system to perform a method for provisioning a connection between a public cloud and an on-premises resource in a private network in response to determining that an application running in the public cloud is to access an on-premises resource of the private network, the method comprising:
based at least on determining that the application running in the public cloud is to access an on-premises resource of the private network, automatically generating a password;
generating a hyperlink pointing to a network address of the on-premises resource that includes at least the password as a query parameter;
based at least on the hyperlink being selected from within the private network, automatically performing the following:
identifying a bridging infrastructure that provides access to the on-premises resource;
causing a configuration package to be downloaded within the private network, wherein the downloaded configuration package uses the password from the query parameter of the hyperlink to acquire resource-specific credentials;
causing a hybrid connection manager on the private network to use the resource-specific credentials to provide connectivity between the on-premises resource on the private network and the bridging infrastructure.

16. The computer system in accordance with claim 15, the on-premises resource in the private network being a first on-premises resource in the private network, the bridging infrastructure being a first bridging infrastructure, the resource-specific credentials being first resource-specific credentials, the method further comprising:
determining that the application running in the public cloud is to access a second on-premises resource of the private network;
automatically performing the following in response to the act of determining that the application running in the public cloud is to access the second on-premises resource of the private network:
identifying a second bridging infrastructure that provides access to the second on-premises resource;
accessing second resource-specific credentials used to connect to the second bridging infrastructure;
creating a configuration package that includes the second resource-specific credentials and the identity of the second on-premises resource, the execution of the executable for the control providing connectivity between the second on-premises resource on private network and the second bridging infrastructure using the second resource-specific credentials.

17. The computer system in accordance with claim 15, the on-premises resource being a server.

18. The computer system in accordance with claim 15, the on-premises resource being storage.

19. The computer system in accordance with claim 15, wherein the determining that an application running in the public cloud is to access an on-premises resource of the private network includes navigating to a web site and indicating to that web site that the on-premises resource is to be made available to the public cloud.

20. The computer system in accordance with claim 15, wherein the method further includes generating application specific credentials that are provided to the application on the public cloud and that are usable by an agent on the public cloud to connect to the identified bridging infrastructure.

* * * * *